April 12, 1927.
E. C. MALIN
1,624,003
ANIMAL SNARE
Filed March 17, 1926
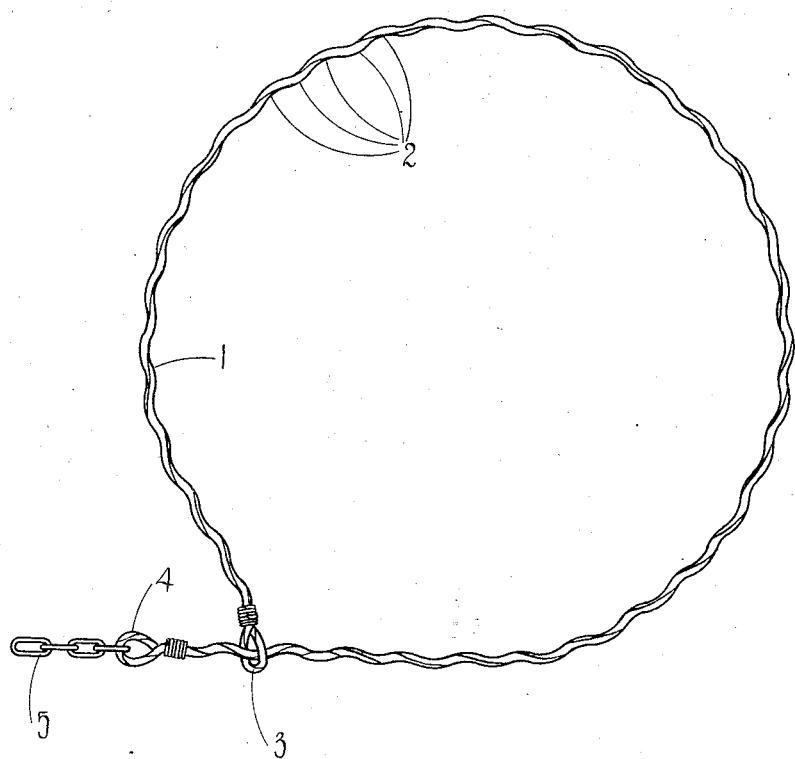
ERNEST COE MALIN
    INVENTOR.
BY *Harold C Shipman*
    ATTORNEY.

Patented Apr. 12, 1927.

1,624,003

UNITED STATES PATENT OFFICE.

ERNEST COE MALIN, OF FERTILE, SASKATCHEWAN, CANADA.

ANIMAL SNARE.

Application filed March 17, 1926. Serial No. 95,412.

The present invention relates to improvements in animal snares and has for its primary object the provision of a snare adapted for catching wolves, coyotes, lynx and animals of a similar nature, which when set, incidental to its formation, will be practically out of sight and very difficult for the animals to discern.

A further object of the invention is to provide a snare embodying the aforesaid characteristics which is very light and durable and may be manufactured at a moderate cost.

In the annexed drawing, which is an elevation of the snare showing the same open or in set position, the numeral 1, designates the cable from which the snare is made, the same including a number of strands of crucible steel wire which are twisted together and formed throughout the length thereof with relatively short curved portions 2. Loops 3 and 4 are formed at each end of the snare, loop 4 passing through loop 3 to form the snare noose. A chain 5 is connected to the loop 4 and may be secured to a sapling or otherwise suitably anchored by means not shown.

It has been experienced that a snare constructed in accordance with the foregoing disclosure is very efficient for catching animals of the nature referred to, which incidental to their timorous and cunning nature and powers of observation are very difficult to catch by baited traps or the conventional snare, the latter being readily discernible unless great precautions are taken to conceal the same. The curvilineal formation of the present snare breaks the outline thereof, and the twisted cable reflects the light in different shades, which makes it imperceptible. In addition, by forming the cable as described, the same is very durable and the possibility of breaking is practically eliminated.

What I claim is:—

1. A snare formed of a wire cable including a number of strands of wire twisted together, said cable being provided with relatively short curves to render the same obscure.

2. A snare provided with undulating curved portions to obscure the visibility of the outline thereof.

3. A snare provided with a multiplicity of curved portions throughout the length thereof.

4. A snare provided with relatively short curved portions to obscure the visibility of the outline thereof; loops at the end of said snare, one of which embraces said snare; and anchoring means connected to the other said loop.

5. A snare formed of a wire cable including a number of strands of crucible steel wire twisted together, said cable being provided throughout its length with a multiplicity of undulating curves.

6. A snare formed of a piece of wire cable including a number of strands of crucible steel wire twisted together, said cable being provided throughout its length with a multiplicity of undulating curves; loops at the ends of said cable; one of which embraces said cable, and anchoring means connected to the other said loop.

In testimony whereof, I affix my signature.

ERNEST COE MALIN.